Jan. 21, 1969  F. F. DERJUGIN ET AL  3,423,550
RELAY RESPONSIVE TO LIMITING CHANGES IN THE
LEVEL AND VELOCITY OF FLUIDS
Filed Jan. 3, 1967

3,423,550
RELAY RESPONSIVE TO LIMITING CHANGES IN THE LEVEL AND VELOCITY OF FLUIDS
Fedor Fedorovich Derjugin, ulitsa Tsvillinga, 44, kv. 103, Alexandr Denisovich Bulitko, ulitsa Rossüskaya, 19–b, kv. 4, and Grigory Ivanovich Plakhotnikov, ulitsa Tsvillinga, 44, kv. 107, all of Chelyabinsk, U.S.S.R.
Filed Jan. 3, 1967, Ser. No. 606,857
U.S. Cl. 200—81.9
Int. Cl. H01h 35/40
1 Claim The present invention relates to relays that respond to limiting changes in the level and velocity of a fluid, such as relays installed in oil-filled power transformers, current-limiting reactors, etc.

Known in the art are gas-actuated float-type relays designed for protection of oil-filled transformers. The float element of these relays is, basically, a flat-bottom cup with a hinged joint at one side, whereas the opposite side is spring-connected to a collector ring. The above-mentioned cup contains a group of moving contacts arranged on a holder that closes fixed contacts mounted on insulating plates of the collector ring (see Swedish Patent No. 204,448).

An essential disadvantage of such types of relays is their inability to respond quickly enough to changes in the limiting value and their low sensitivity due to the considerable damping effect of the oil spread over a large area of the above-mentioned cup. This is also an inherent disadvantage of other known types of gas-actuated relays.

An object of the present invention is to eliminate said disadvantages.

A further and more specific object is to provide a relay responding quickly to limiting changes in the velocity and level of a fluid.

A favorable solution of said problems is attained by a relay responding to limiting changes in the level and velocity of a fluid and placed in the fluid and provided with a vane holder that is hinged to the bottom of the cup and arranged so that upon any change in the fluid level, the cup actuates the vane holder and turns the latter in the direction of operation of the signalling contacts.

The invention will further be described by way of example with reference to the accompanying drawings wherein.

Figure 1:
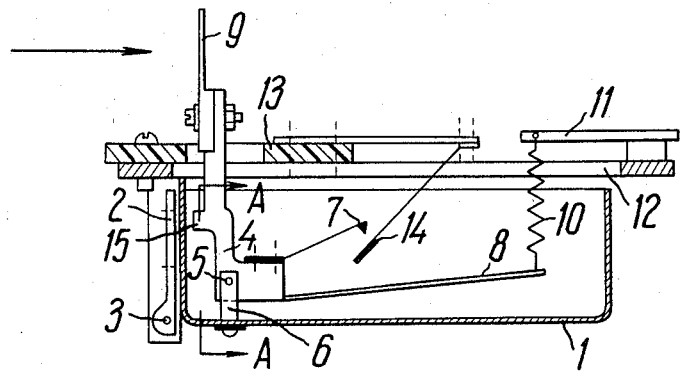
FIG. 1 is an elevation view partly in section showing the construction of the relay according to the present invention.
Figure 2:
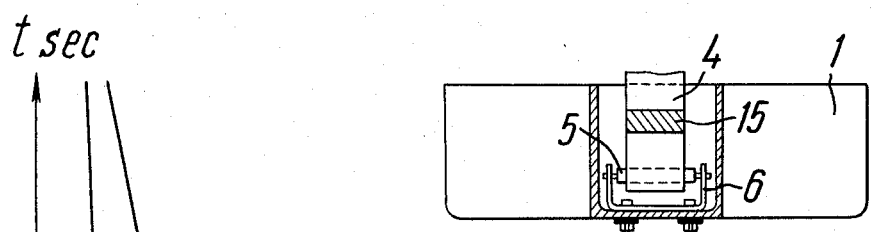
FIG. 2 is a cross-sectional view taken on line A—A in FIG. 1.

As will become apparent from FIGS. 1 and 2, the relay proposed herein consists of flat-bottom aluminum cup 1 attached to support 2 and capable of rotating about shaft 3 that is press-fitted on support 2.

Cup 1 contains a moving holder 4 made of insulating material (for instance, of plastic material), a metallic shaft 5 the ends of which rest against the bearings of bracket 6 fixed to the bottom of cup 1, shaft 5 being press-fitted into holder 4.

Holder 4 supports a moving bridge contact 7, a lever 8 and a vane 9 positioned at the upper part of the holder. Vane 9 serves as the sensing element of the relay and is actuated by the flow of liquid. The end of lever 8 is forced constantly upwards by spring 10, the opposite end of the spring being fixed to arm 11a. All the components of the relay are mounted on a collector ring 12; insulating plate 13, on which fixed contacts 14 are arranged, is also secured to ring 12. A hole is made in insulating plate 13 for passing the upper end of holder 4 to which vane 9 is attached. The middle part of moving holder 4 has a projecting lug 15 that is pressed against the inner side of the cylindrical section of cup 1 by spring 10 when there is no flow of liquid through the relay. Owing to such an attachment, the moving holder 4 system becomes well damped (as the cup immersed in the liquid is a good damper) and is not subjected to the effect of vibration. In view of the fact that moving holder 4 is capable of moving irrespective of the position of cup 1, the operating time of the relay is considerably reduced when dynamic pressure of the fluid is applied to vane 9, as the moment of inertia of the moving parts is much less than in the case of relays with moving contacts attached rigidly to the floats or cups, i.e. when these parts are subjected to a drag torque due to their rotation in the fluid.

The relay proposed herein operates in the following manner.

At a flow of the liquid (i.e., oil) from the relay shell (at complete emptying of the shell), the weight of the liquid (oil) remaining in cup 1 sets up a torque about shaft 3 and, as a result, the side of the cup opposite shaft 3 is lowered; in this event cup 1 by means of lug 15 actuates moving holder 4, thus causing the latter to rotate about shaft 5 and close contacts 14.

Due to the presence of dynamic pressure of the fluid, a torque is applied to a vane which causes rotation of holder 4 and closes contacts 14, while cup 1 may remain motionless during this process.

Figure 3:
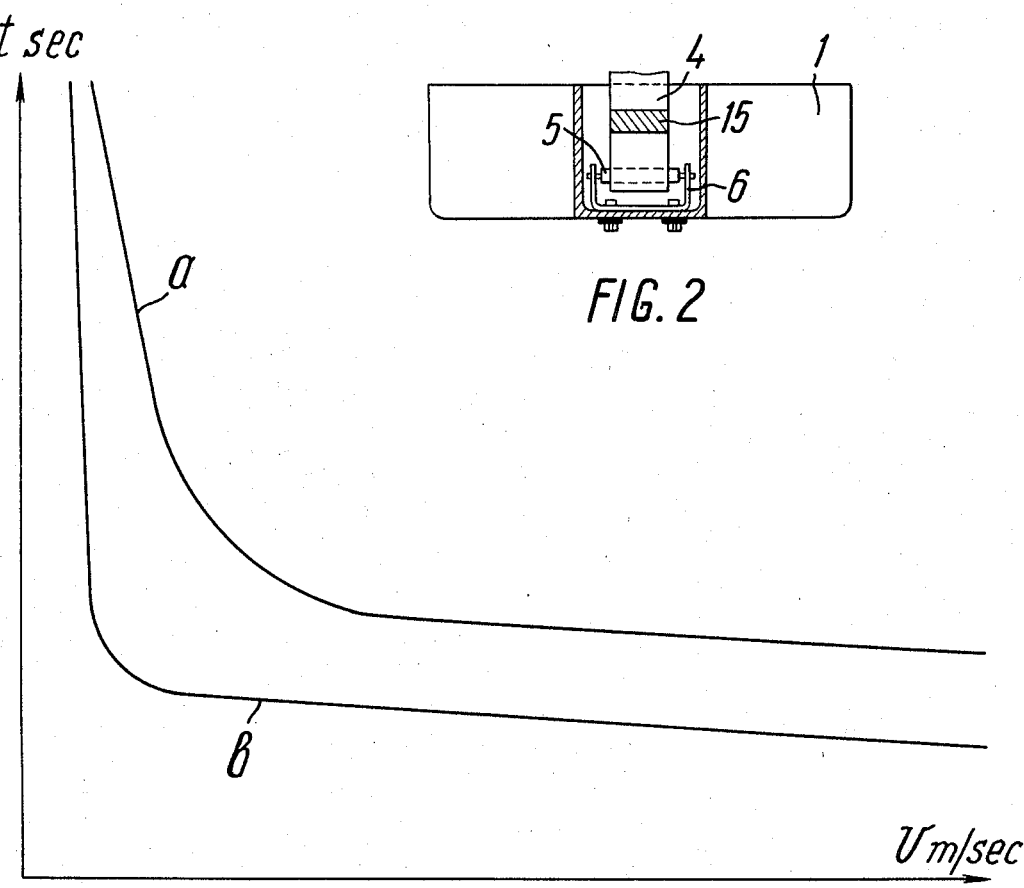
FIG. 3 illustrates the response curves of different types of relays.

Response curves of different types of relays are compared in FIG. 3. Curve $a$ characterizes the operation of a relay in which the moving contacts are attached rigidly to the float, whereas curve $b$ characterizes the operation of the disclosed relay, wherein the vane actuates the contacts irrespective of the relay cup.

It can be seen from the curves presented in the above drawing that for an equal velocity of the fluid, the operating time of the relay proposed herein is substantially less than that of known relays.

What is claimed is:
1. A relay responsive to limiting changes in the level and velocity of a fluid and placed in the fluid, comprising: A cup mounted by a hinged joint at one side and a spring attachment at the opposite side; a group of signalling contacts mounted within the above-mentioned cup; a vane for closing said contacts in response to dynamic pressure of the fluid, a holder to which said vane is rigidly fixed, said holder being connected to said contact to operate the same, the holder being hinged to said cup so that with any change in the fluid level, the cup actuates the holder and turns the latter in the direction of operation of the contacts.

References Cited

UNITED STATES PATENTS

| | | |
|---|---|---|
| 2,329,292 | 9/1943 | Perry. |
| 3,119,979 | 1/1964 | Martin _____ 200—81.9 X |

FOREIGN PATENTS

| | | |
|---|---|---|
| 204,448 | 5/1966 | Sweden. |

ROBERT K. SCHAEFER, *Primary Examiner.*

H. BURKS, *Assistant Examiner.*

U.S. Cl. X.R.

200—85